(12) United States Patent
Dalla Valle et al.

(10) Patent No.: US 9,021,818 B2
(45) Date of Patent: May 5, 2015

(54) DEVICE FOR COOL DRYING

(75) Inventors: Monica Dalla Valle, Chiampo (IT); Wouter Denis Ann Van Dijck, Londerzeel (BE)

(73) Assignee: Atlas Copco Airpower, Naamloze Vennootschap, Wilrijk (BE)

( * ) Notice: Subject to any disclaimer, the term of this patent is extended or adjusted under 35 U.S.C. 154(b) by 1634 days.

(21) Appl. No.: 11/988,872

(22) PCT Filed: Jun. 1, 2006

(86) PCT No.: PCT/BE2006/000063
§ 371 (c)(1), (2), (4) Date: Jan. 16, 2008

(87) PCT Pub. No.: WO2007/022604
PCT Pub. Date: Mar. 1, 2007

(65) Prior Publication Data
US 2009/0025407 A1    Jan. 29, 2009

(30) Foreign Application Priority Data
Aug. 25, 2005    (BE) .................................. 2005/0405

(51) Int. Cl.
*F25D 17/06* (2006.01)
*B01D 53/26* (2006.01)

(52) U.S. Cl.
CPC .................................... *B01D 53/265* (2013.01)

(58) Field of Classification Search
CPC ..................................................... B01D 53/265
USPC ............. 236/44 R; 62/89, 93, 129, 150, 180, 62/183, 228.4, 196.3, 498, 515
See application file for complete search history.

(56) References Cited

U.S. PATENT DOCUMENTS

| | | | | |
|---|---|---|---|---|
| 4,289,272 A * | 9/1981 | Murase et al. | ............... | 236/91 D |
| 4,910,966 A * | 3/1990 | Levine et al. | ................... | 62/129 |
| 5,157,932 A * | 10/1992 | Noji et al. | ........................ | 62/126 |
| 5,257,508 A * | 11/1993 | Powell et al. | ................... | 62/180 |
| 5,335,514 A * | 8/1994 | Hennessee et al. | ............. | 62/227 |
| 5,769,314 A * | 6/1998 | Drees et al. | .................. | 236/49.3 |
| 6,112,807 A * | 9/2000 | Dage | ............................. | 165/202 |
| 6,393,850 B1 * | 5/2002 | Vanderstraeten | ............ | 62/196.3 |
| 6,419,454 B1 * | 7/2002 | Christiansen | ..................... | 417/4 |
| 6,460,359 B1 | 10/2002 | Lauwers | | |
| 6,477,849 B2 * | 11/2002 | Butts et al. | ....................... | 62/129 |
| 2003/0020619 A1 * | 1/2003 | Winters et al. | ................ | 340/632 |
| 2004/0237552 A1 * | 12/2004 | Yamasaki et al. | ............... | 62/229 |

FOREIGN PATENT DOCUMENTS

EP    1 103 296 A1    5/2001

* cited by examiner

*Primary Examiner* — Frantz Jules
*Assistant Examiner* — Azim Abdur Rahim
(74) *Attorney, Agent, or Firm* — Bacon & Thomas, PLLC

(57) ABSTRACT

Device for cool drying comprising a heat exchanger (2) whose primary part is the vaporizer (3) of a cooling circuit (4) which also includes a compressor (6) driven by a motor (5), a control device (16) for this motor (5) and measuring device (17) for the lowest air temperature (LAT), measuring device (18) for the ambient temperature (Tamb) and a flow meter (19), whereby this control device (16) can be at least switched in a first user mode in which the cooling circuit (4) is only activated when the gas flow exceeds a preset value and a second user mode in which the lowest air temperature (LAT) is maintained within a certain range by controlling the cooling circuit (4).

22 Claims, 3 Drawing Sheets

DEVICE FOR COOL DRYING

BACKGROUND OF THE INVENTION

A. Field

The present invention concerns an improved device for cool drying.

B. Related Art

In particular, the present invention concerns a device for cool drying, comprising a heat exchanger whose primary part is the vaporizer of a cooling circuit which also comprises a compressor which is driven by a motor, a condenser, an expansion means between the outlet of the condenser and the inlet of the vaporizer, a control device for controlling the above-mentioned motor and measuring means coupled thereto, whereas the secondary part of the heat exchanger is part of a pipe for the gas to be dried, whereby in this pipe a liquid separator is placed at the outlet of the secondary part of the heat exchanger.

Compressed air supplied for example by a compressor is in most cases saturated with water vapour or has, in other words, a relative humidity of 100%. This implies that, in case of a temperature drop below what is called the dew point, there will be condensation. The condensed water gives rise to corrosion in pipes and tools, and appliances may wear prematurely.

That is why compressed air is dried, which may be done with the above-mentioned device for cool drying. Also other gases may be dried with such a device.

Cool drying is based on the principle that by lowering the air or gas temperature in the vaporizer, moisture in the air or gas will condense, after which the condensed water is separated in a liquid separator and after which the air or gas is heated again, such that this air or gas will be no longer saturated.

The same applies to any other gas than air, and each time we hereafter refer to air, the same also applies to any other gas than air.

A device for cool drying is already known, whereby the above-mentioned measuring means are made as means for measuring the vaporizer pressure or the vaporizer temperature, whereby the cooling circuit is switched on or off on the basis of the measured values coming from said measuring means.

If a take-off of compressed air is recorded, the cooling circuit is started and as soon as the take-off of compressed air stops again, the cooling circuit is stopped again as well.

A disadvantage of such a known device is that the heat exchanger, after the cooling circuit has been switched off, will heat up as there is no cooling any more.

When, subsequently, compressed air is taken off again while the heat exchanger has heated up in the meantime, temperature and dew point peaks may instantly occur in the supplied compressed air, since the gas to be dried in the heat exchanger is not sufficiently cooled then to make the water in said gas to be dried condense at maximum capacity.

A device for cool drying is known as well, provided with a thermal mass, for example in the form of a mixture of water and propylene glycol, for cooling the compressed air.

With such known devices, the cooling circuit is only used for cooling the above-mentioned thermal mass, such that the compressor in this cooling circuit can be switched off as soon as the thermal mass has reached a certain temperature, as a result of which energy can be saved.

A disadvantage of such a known device is that the cooling circuit, due to the presence of the above-mentioned thermal mass, must be made very heavy and sizeable.

Another disadvantage of such a known device is that, due to additional parts such as a reservoir and/or an additional heat exchanger, the construction of the cooling circuit is relatively expensive and complicated and its assembly is very time-consuming.

SUMMARY

The present invention aims to remedy one or several of the above-mentioned and other disadvantages.

To this end, the invention concerns a device for cool drying of the above-mentioned type, whereby the above-mentioned measuring means includes a first temperature measuring device for measuring the lowest air temperature of the gas to be dried, a second temperature measuring device for measuring the ambient temperature and a flow meter in the above-mentioned pipe for the gas to be dried, whereby the above-mentioned control device can be switched in at least two user modes, namely a first user mode in which the cooling circuit is only activated when the measured flow of the gas to be dried through the above-mentioned pipe exceeds a preset value and in which the cooling circuit is switched off each time the lowest air temperature drops to a preset minimum value, and remains switched off until the lowest air temperature has reached a certain top value, and a second user mode in which, by controlling the cooling circuit, the measured lowest air temperature is maintained within a certain range which is a function of the ambient temperature.

By the lowest air temperature or LAT is meant here the lowest temperature of the air to be dried which occurs during cool drying and which is in principle reached at the outlet for the gas to be dried of the secondary part of the heat exchanger. The LAT always gives a good indication of the dew point of the air, since there is a connection between both.

An advantage of such a device is that the temperature of the heat exchanger is always restricted, since the cooling circuit is started again when the measured LAT or the dew point becomes too high, and thus peaks are avoided.

Since the above-mentioned top value for the LAT in the first user mode and the above-mentioned range for the LAT in the second user mode can be adjusted as desired, a dew point can be guaranteed at all ambient temperatures which is sufficiently low to prevent corrosion or condensate in the compressed air network following the device for cool drying.

Another advantage of such a device according to the invention is that no extra thermal mass is required and that energy can be saved in a very simple manner, since the cooling circuit is switched off in due time, for example when no compressed air needs to be dried since there is no consumption of compressed air.

Another advantage is that, thanks to the presence of the above-mentioned flow meter, it is possible to switch off the cooling circuit, for example in case of zero load, as a result of which more energy can be saved.

BRIEF DESCRIPTION OF THE DRAWINGS

In order to better explain the characteristics of the present invention, the following preferred embodiment of an improved device for cool drying according to the invention is given as an example only, with reference to the accompanying drawings, in which.

DETAILED DESCRIPTION OF PREFERRED EMBODIMENTS OF THE INVENTION

Figure 1:
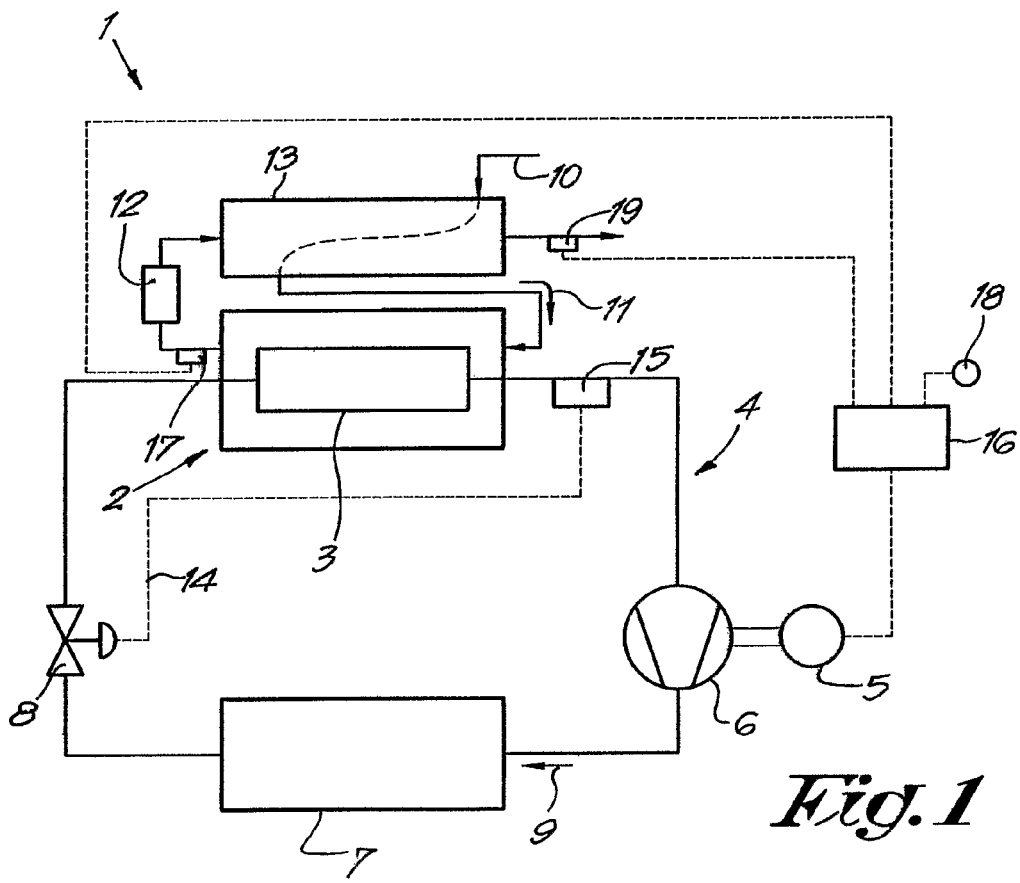
FIG. 1 represents an improved device according to the invention for cool drying.

FIG. 1 represents a device 1 for cool drying which mainly consists of a heat exchanger 2 whose primary part forms the vaporizer 3 of a cooling circuit 4 in which are successively also erected a compressor 6, driven by a motor 5, a condenser 7 and an expansion means 8.

This cooling circuit is filled with cooling fluid, for example Freon R410a, whose stream direction is indicated by arrow 9.

The secondary part of the heat exchanger 2 is part of the pipe 10 for humid air to be dried whose stream direction is represented by arrow 11.

After the heat exchanger 2, i.e. at its outlet, a liquid separator 12 is placed in the pipe 10.

This pipe 10, before reaching the heat exchanger 2, may extend partly through a pre-cooler or a recuperation heat exchanger 13 and then, following the liquid separator 12, extend through the recuperation heat exchanger 13 again, in parallel flow or counter flow to the above-mentioned part.

The outlet of the above-mentioned pipe 10 can for example be connected to a compressed air network which is not represented in the figures, to which consumers of compressed air are connected, for example tools that are driven by compressed air.

The heat exchanger 2 is a liquid/air heat exchanger and may be designed as forming a whole with the possible recuperation heat exchanger 13 which is an air/air heat exchanger.

The expansion means 8 is in this case made in the shape of a thermostatic valve provided between the outlet van de condenser 7 and the inlet of the vaporizer 3 and whose thermostatic element is coupled in the known manner by means of a pipe 14 to a bulb 15 provided at the outlet of the vaporizer 3, in other words between the vaporizer 3 and the compressor 6, on the cooling circuit 4.

It is clear that the above-mentioned expansion means 8 can be realised in many different ways, such as for example in the form of an electronic valve which is coupled to a temperature gauge which is placed on the far end of the vaporizer 3 or following it.

In some small cool dryers 1, the expansion means 8 may be replaced by a capillary tube.

The compressor 6 is for example a volumetric compressor which, at the same rotational speed, delivers practically the same volume flow, for example a spiral compressor, whereas the motor 5 is an electric motor in this case which is coupled to a control device 16.

The above-mentioned control device 16 which, according to the invention, can be switched between at least two user modes which are hereafter discussed in detail, can for example be made in the form of a PLC, and is also connected according to the invention to measuring means which, according to the invention, are at least made in the form of first measuring device 17 for measuring the lowest air temperature (LAT) of the gas to be dried, a second temperature measuring device 18 for measuring the ambient temperature Tamb and a flow meter 19.

The above-mentioned first measuring device 17 for the LAT are preferably provided on the spot where the lowest air temperature of the air to be dried can be actually expected, which is in this case right after the secondary part of the heat exchanger 2 and preferably before the liquid separator 12.

According to the invention, it is not excluded that the first measuring device 17 for measuring the LAT are replaced by measuring means for measuring the dew point, which are preferably provided near the outlet of the second part of the above-mentioned heat exchanger 2. Consequently, each time measuring device 17 for measuring the LAT are mentioned hereafter, also measuring means for measuring the dew point can be applied according to the invention.

The above-mentioned second measuring device 18 for the ambient temperature (Tamb) are preferably placed at the compressed air network which makes use of the air dried by the device 1, in particular near to the end consumers of this compressed air, for example near the tools which are driven by this dried compressed air.

Alternatively, the second measuring device 18 for the ambient temperature can also be provided in other places. In case the compressed air to be dried comes for example from a compressor, it turns out that a good positioning for the above-mentioned second measuring device 18 for the ambient temperature is at the inlet of such a compressor.

According to the invention, the second measuring device 18 can also be provided on the device 1 for cool drying, but they must always be placed such that they make it possible to measure the average ambient temperature.

The above-mentioned flow meter 19 is provided in the above-mentioned pipe 10 for the gas to be dried, in this case after the recuperation heat exchanger 13. It is clear that this flow meter 19 can be provided anywhere in the pipe 10.

In this case, the flow meter 19 is made in the shape of a sensor which, as soon as a preset gas flow flows through the pipe 10, emits an output signal, but which does not determine the magnitude of said gas flow through the pipe 10 any further.

In another embodiment of a device 1 according to the invention, it is not excluded, of course, to make use of a flow meter 19 which does measure the magnitude of the gas flow through the pipe 10, such that this can be taken into account when controlling the cooling circuit 4.

The working of an improved device 1 according to the invention for cool drying is very simple and as follows.

The air to be dried is fed through the pipe 10 and thus through the heat exchanger 2, for example in counter flow to the cooling fluid in the vaporizer 3 of the cooling circuit 4.

In this heat exchanger 2, the humid air is cooled, as a result of which condensate is formed which is separated in the liquid separator 12.

The cold air, which contains less moisture in absolute terms after said liquid separator 12, but still has a relative humidity of 100%, is heated in the recuperation heat exchanger 13, as a result of which the relative humidity decreases to preferably less than 50%, whereas the fresh air to be dried is already partly cooled in the recuperation heat exchanger 13 before being supplied to the heat exchanger 2.

Thus, the air at the outlet of the recuperation heat exchanger 13 is drier than at the inlet of the heat exchanger 2.

The working of the cooling circuit 4 is already known as such and it is as follows.

In the condenser 7, the gaseous cooling fluid which is heated by the compression in the compressor 6, is cooled until it becomes liquid. In order to discharge the heat to the environment, use can for example be made of a cooling medium, such as for example water or air.

Thanks to the expansion means 8, the liquid cooling fluid expands to a constant vaporizer pressure, which of course implies a temperature drop.

By applying a thermostatic expansion valve 8 and a bulb 15 in the known manner, there will usually be overheating after the vaporizer 3, such that there is no danger of cooling fluid entering the compressor 6, and, as a consequence, there usually is no need for a liquid separator in the cooling circuit 4.

According to the invention, the LAT of the gas to be dried is preferably maintained within certain limits, so as to prevent freezing of the vaporizer 3 due to a too low LAT on the one hand, and to make sure that the air is still sufficiently cooled so as to allow for condensation on the other hand.

Figure 2:
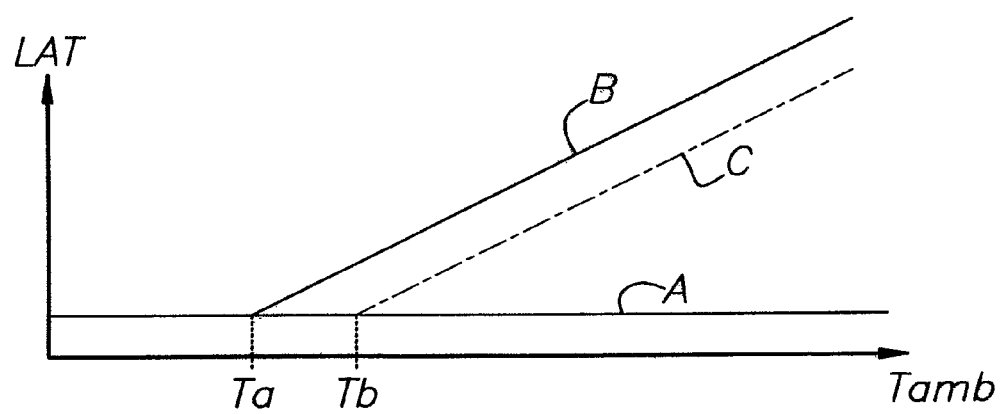
FIG. 2 represents, for the first user mode of a device according to the invention, a possible course of the minimum and the top LAT values as a function of the ambient temperature.

When the first user mode of the control device 16 is selected, the cooling circuit 4 is switched off each time the LAT of the gas to be dried drops to a preset minimum value A, represented in FIG. 2 and which is constant in this case and preferably but not necessarily equal to 1° C.

The above-mentioned set minimum value A for the LAT may also have another course according to the invention, but it must be sufficiently high at every value of the ambient temperature to avoid freezing of the cooling medium in the cooling circuit 4.

When the LAT then reaches a certain top value B, the cooling circuit 4 is started again by the above-mentioned control device 16 as the above-mentioned motor 5 is activated again.

In this case, the control device 16 is provided with an algorithm as a function of the ambient temperature Tamb and which is used to calculate said top value B of the LAT.

In the example of FIG. 2, the curve B has a constant course below a certain first value Ta of the ambient temperature, whereas it has a linear ascending course above said first value Ta.

It is clear that the above-mentioned top value B may also have many other courses, such as for example in the form of a step function or a constant value. Hence, it is not required according to the invention that this top value B is calculated as a function of the measured ambient temperature Tamb.

According to the invention, the control device 16 also takes into account measurements of the above-mentioned flow meter 19 in said first user mode, such that the cooling circuit 4 is only activated when the measured flow of the gas to be dried through the above-mentioned pipe 10 exceeds a set value.

In this manner is avoided that the cooling circuit 4 stays operational when the device 1 for cool drying is not loaded at all or only to a limited extend, which helps to save energy.

Preferably but not necessarily, the above-mentioned control device 16 is connected to signalling means, not represented in the figures, which indicate when the measured LAT of the gas to be dried drops under a certain signal value C and which can be made in the shape of an LED, an intermittent light, a loudspeaker or any other signalling means or a combination of these means.

In that case, the control device 16 is preferably also provided with an algorithm which is a function of the ambient temperature Tamb for calculating the above-mentioned signal value C.

FIG. 2 represents a possible course of the above-mentioned signal value C, which in this case is constant up to a certain second value Tb of the ambient temperature Tamb and which has an almost linear ascending course above said value Tb which is for example always situated at a constant value under the ambient temperature Tamb. It is clear that the curve C according to the invention may also have another course.

Figure 3:
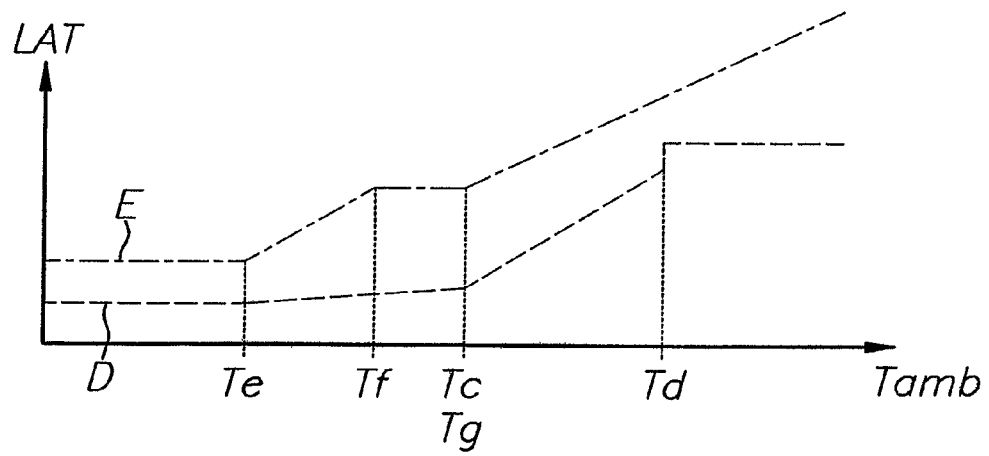
FIG. 3 represents a possible course of the LAT range as a function of the ambient temperature 5 for the second user mode of the device according to the invention.

In the second user mode of the control device 16, the cooling circuit 4 is controlled by switching on and off the above-mentioned driving motor 5 of the compressor 6, so as to always maintain the LAT of the gas to be dried within a certain range and in this case, as represented in FIG. 3, between a preset minimum and maximum threshold value D, E respectively, which are calculated by means of algorithms which are a function of the measured ambient temperature Tamb.

In the given example, the minimum threshold value D in this case progresses according to a step function which, when the ambient temperature Tamb is situated beneath a first set value Tc, is almost constant, and in this case amounts to some 3° C., so as to prevent freezing of the vaporizer 3.

When the ambient temperature Tamb rises above a second set value Td which is higher than the above-mentioned first set value Tc, the above-mentioned step function of the minimum threshold value D will be constant as well in this case.

Between the above-mentioned set values Tc and Td, the above-mentioned step function of the algorithm of the minimum threshold value D has an ascending course which in this case is linear, but not necessarily, and which is also preferably such that the difference between the ambient temperature Tamb and this calculated minimum threshold value D is constant.

In this case, the algorithm of the maximum threshold value E is also formed by a step function which, at each value of the ambient temperature Tamb, has a larger value than the step function of the above-mentioned minimum threshold value D and which, when the ambient temperature Tamb is smaller than a first set value Te, is constant.

Above this first set value Te and up to a second set value Tf, the curve of the maximum threshold value E in this case has a linear ascending course.

As of this second set value Tf, the above-mentioned step function of the algorithm of the maximum threshold value E has a constant course up to a third set value Tg, above which the maximum threshold value E has a linear ascending course again.

In this case, the above-mentioned third set value Tg for the maximum threshold value E is equal to the first set value Tc for the minimum threshold value D. It is clear, however, that this is not required at all according to the invention.

The aim of the above-mentioned maximum threshold value E is to avoid that the LAT would become too high, as a result of which the air would not be sufficiently cooled, and as a result of which not enough moisture would condense so as to be able to dry the air.

Preferably, according to the invention, while the device 1 for cool drying is operational, the measured value of the LAT as measured by the measuring device 17 is continuously compared by the above-mentioned control device 16 or compared at certain, either or not regular, intervals, for example with a certain frequency, to the above-mentioned minimum threshold value D and the maximum threshold value E.

When the LAT of the gas to be dried temporarily drops under the minimum threshold value D, the above-mentioned control device 16 will switch off the cooling circuit 4, by switching off the motor 5 which drives the compressor 6 of this cooling circuit 4, such that the temperature in the above-mentioned vaporizer 3 rises and also the LAT will increase again.

When the measured LAT rises above the maximum threshold value E, the cooling circuit 4 is switched on again, as the motor 5 which drives the compressor 6 of this cooling circuit 4 is switched on again, as a result of which the temperature in the vaporizer 3 decreases and also the LAT drops again.

Since the cooling circuit 4 is only switched on when this is required, a method for cool drying according to the invention will help to save energy.

By switching on the cooling circuit 4 again in due time, one also makes sure that the heat exchanger 2 does not heat up, such that when the compressed air supply is loaded again, for example after a standstill, there can be no temperature and dew point peaks in the compressed air being taken off.

If required, but not necessarily, the cooling circuit 4 can be switched off in this second user mode when the flow of the gas to be dried, as observed by the flow meter 19, through the above-mentioned pipe 10 is smaller than a preset value, but according to the invention it is also possible for the cooling circuit 4 to stay operational in case of a zero load and/or partial load.

Figure 4:
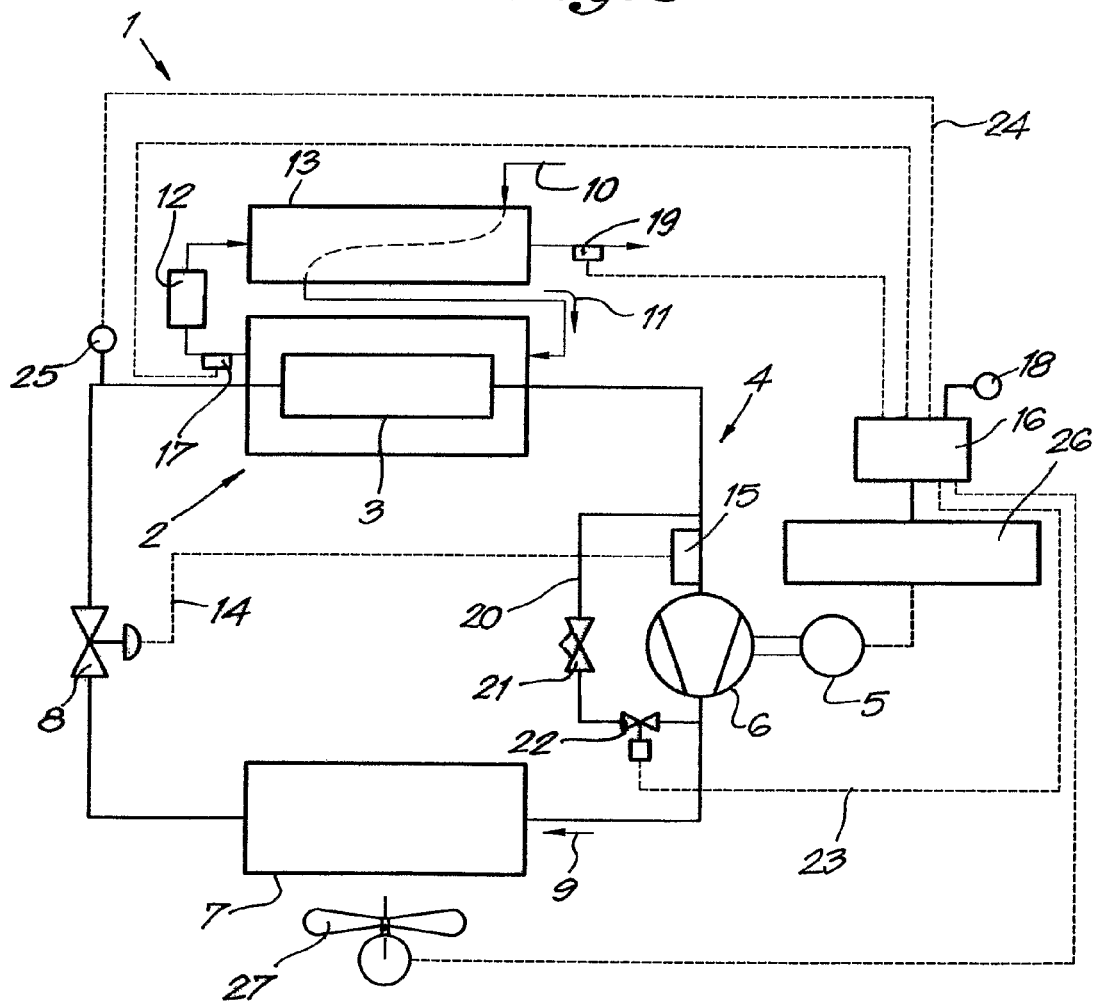
FIG. 4 represents a variant according to FIG. 1.

FIG. 4 represents another embodiment of a device 1 according to the invention, whereby a bypass pipe 20 is provided in the cooling circuit 4 over the above-mentioned refrigeration compressor 6, in which a conventional bypass valve 21 is provided with a valve body which is pushed open by a spring as soon as the pressure in the bypass 20 drops beneath a certain value. The counter pressure with which the spring pushes open said valve body, and thus the above-mentioned pressure, is adjustable.

In series with said bypass valve 21, namely between the latter and the outlet of the refrigeration compressor 6, is placed another opening/shut-off valve 22 which consists for example of an electromagnetic valve.

This opening/shut-off valve 22 is connected to the control device 16 via an electrical wire 23 and is controlled by said control device.

The control device 16 is in this case connected, via a wire 24, to measuring means 25 for measuring the vaporizer temperature, for example a thermocouple in the cooling circuit 4, at the inlet of the vaporizer 3 and thus between this vaporizer 3 and the expansion means 8. By the vaporizer temperature is meant here the temperature of the cooling fluid in the cooling circuit 4, right before or after the vaporizer 3.

The device which is represented in FIG. 4 is also provided with means 26 to adjust the rotational speed of the motor 5, which are connected to the above-mentioned control device 16 and which in this case are made as a frequency transformer.

Opposite the above-mentioned condenser 7 is in this case provided a fan 27 to cool the latter, which is also connected to the above-mentioned control device 16.

The working of such a variant of a device 1 according to the invention is very simple and as follows.

The working of the first user mode in this embodiment of the device 1 is practically identical to that of the preceding embodiment, whereby in this case as well, the LAT of the gas to be dried is always maintained above the minimum value A of FIG. 2 by switching off the cooling circuit 4 in due time.

The driving motor 5 of the refrigeration compressor 6 is also switched on again as soon as the LAT measured by the measuring means 17 reaches a top threshold value B, which can be calculated by the control device 16 for example by means of an algorithm which is a function of the ambient temperature.

The flow meter 19 also makes sure in this case that the cooling circuit 4 is switched off in case of a zero load or restricted partial load so as to save energy.

Thanks to the presence of the above-mentioned bypass 20 over the refrigeration compressor 6, an additional control becomes possible.

The vaporizer temperature, which is measured by the measuring means 25, in this case has a directional value, i.e. a set value to which the control device 16 tries to bring the actually measured vaporizer temperature, which directional value is situated a few degrees below the required LAT.

Whether the bypass 20 is either or not opened is initially determined by the opening/shut-off valve 22 which is controlled by the control device 16.

When the vaporizer temperature is considerably lower than the above-mentioned directional value, for example as it deviates more than 1.5° C. from the latter, the opening/shut-off valve 22 is opened by the control device 16.

Once the opening/shut-off valve 22 has opened the bypass, it is the bypass valve 21 which determines when the bypass 20 will be actually opened.

This bypass valve 21 will no longer close the bypass 20 as soon as the vaporizer temperature at its outlet, i.e. inside the bypass 20 on the side of the inlet of the compressor 6, drops beneath a certain value, as a result of which hot gases of the compressor 6 can flow through the bypass 20 and the vaporizer pressure will not drop any further.

This bypass valve 21 and the set pressure at which the spring no longer keeps the latter shut, are selected such that the bypass valve 21 is shut under the nominal operational conditions of the cooling circuit 4, but that said bypass valve 21 is open in case of a partial and zero load, such that the vaporizer pressure is maintained at a minimum, and such that the vaporizer temperature which is coupled to the vaporizer pressure of the cooling fluid, after the vaporizer 3, amounts to at least 0° C. so as to prevent ice formation in the vaporizer 3.

Opening the bypass may cause the LAT to rise again.

When the vaporizer temperature measured by the measuring means 25 has come close enough again to the above-mentioned directional value, for example to less than 0.5° C., the opening/shut-off valve 22 is shut again.

Figure 5:
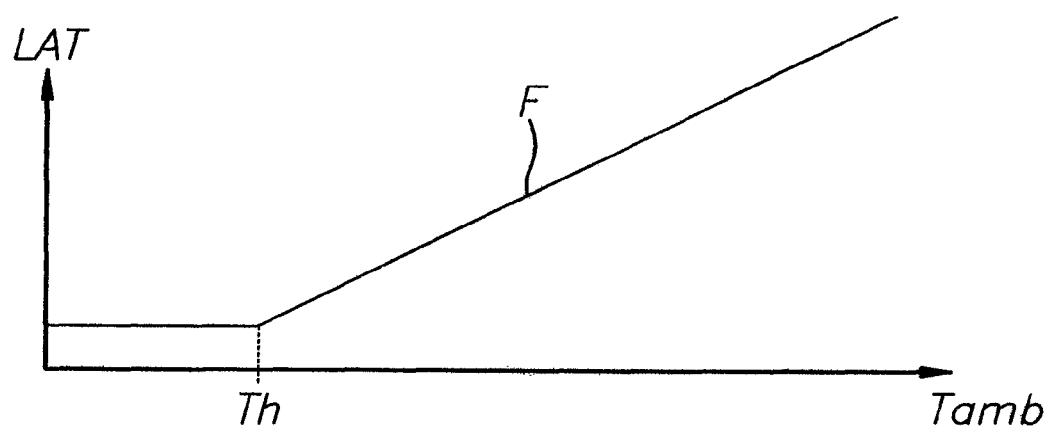
FIG. 5 represents a variant according to FIG. 3.

In the second user mode of this embodiment of device 1 according to the invention for cool drying, as represented in FIG. 5, the lowest air temperature LAT is kept within a certain range as it is adjusted to a desired LAT value which is represented by the curve F and which can be calculated for example on the basis of an algorithm which is a function of the ambient temperature.

In this case, the above-mentioned curve has a constant value up to a first set value Th of the ambient temperature Tamb and it will rise linearly at higher ambient temperatures, but it goes without saying that it may have any other course whatsoever to prevent freezing of the vaporizer 3 and also allow for the formation and separation of condensate.

The control device 16 will continuously compare the measured lowest air temperature LAT of the gas to be dried, or at either or not regular intervals, to the required LAT value and subsequently adjust the rotational speed of the above-mentioned motor 5 by means of the above-mentioned frequency transformer, so as to adjust the actual LAT to the calculated LAT.

In order to make the lowest air temperature rise, the rotational speed of the motor 5 must be slowed down by the frequency transformer, whereas a decrease of the lowest air temperature can be obtained by putting up the rotational speed of the motor 5 and thus of the refrigeration compressor 6.

Thanks to the presence of the bypass 20, equipped with the bypass valve 21 and the opening/shut-off valve 22 on the one hand, and the rotational speed-adjusted compressor 6 on the other hand, not only the number of times that the motor 4 is stopped and started again is strongly reduced, but also a highly improved dynamic behaviour is obtained.

In this embodiment of device 1, also the above-mentioned fan 27 for cooling the condenser 7 can be controlled by the control device 16, for example on the basis of measurements of the condenser temperature, as a result of which this temperature can be kept as low and as constant as possible.

Naturally, the above-mentioned fan can be switched on and off on the basis of other criteria, such as for example as a function of the flow of gas to be dried flowing through the secondary part of the heat exchanger 2.

In each of the above-mentioned embodiments of a device 1 according to the invention, the control device 16 is preferably made such that, each time the refrigeration compressor 6 is started up in the first or second user mode, it must stay operational during a certain time interval, whereby this time interval depends on the characteristics of the motor 5 and the cooling compressor 6. The number of times per hour that the motor 5 is started is preferably limited so as to avoid overloading the motor 5.

In a preferred embodiment of a device 1 according to the invention, each time the motor 5 is started, the frequency during a certain time interval of for example 30 seconds is kept constant, preferably at about 50 Hz.

It is clear that a device according to the invention is not restricted to an embodiment in which a rotational speed adjustment of the motor 5 is combined with a bypass 20 and a controlled fan 27, but that a device 1 according to the invention may have only one or both of these characteristics.

Instead of humid air, other gas than air containing water vapour can be dried in the same manner and with the same device. The LAT is the lowest gas temperature then.

The present invention is by no means limited to the embodiments given as an example and represented in the accompanying drawings; on the contrary, such an improved device 1 according to the invention for cool drying can be realised in all sorts of shapes and dimensions and according to many variants while still remaining within the scope of the invention.

The invention claimed is:

1. A device for cool drying a gas comprising:
    a cooling circuit including a heat exchanger having a vaporizer, a compressor for compressing a cooling fluid, wherein said compressor is driven by a motor, a condenser arranged to condense said cooling fluid, an expansion device between an outlet of the condenser and an inlet of the vaporizer, a control device arranged to control the motor of the compressor, and a measuring device coupled thereto;
    said heat exchanger having an inlet and outlet pipe arranged to receive the gas to be dried;
    a liquid separator connected to the outlet pipe of the heat exchanger,
    wherein the measuring device includes a first temperature measuring device arranged to measure the lowest air temperature of the gas to be dried, a second temperature measuring device arranged to measure the ambient temperature and a flow meter in the pipe for the gas to be dried,
    wherein said control device is configured so that the control device is switchable in at least two user modes for controlling the lowest air temperature of the gas to be dried, said at least two user modes including;
    a first user mode in which the cooling circuit is only activated when the measured flow of the gas to be dried through the pipe exceeds a preset value and where the cooling circuit is switched off each time the lowest air temperature drops to a preset minimum value, and remains switched off until the lowest air temperature has reached a certain top value, and
    a second user mode in which the cooling circuit is controlled by switching the motor on and off, so as to maintain the lowest air temperature of the gas to be dried between a preset minimum and maximum threshold value, and wherein the control device is provided with algorithms using a function of the measured ambient temperature for calculating the threshold values,
    wherein said minimum threshold value is determined according to a step function configured so that said minimum threshold value is constant for ambient temperatures lower than a first set value and constant for ambient temperatures higher than a second set value, and wherein the minimum threshold value increases as the ambient temperatures increase for ambient temperatures between the first and second set value, and
    wherein said maximum threshold value is determined according to a step function configured so that the maximum threshold value is constant for ambient temperatures lower than a third set value and maximum threshold value increases as the ambient temperature increases for ambient temperatures between the third set value and a fourth set value, said fourth set value being higher than the third set value.

2. Device according to claim 1, wherein the control device is made such that in the first user mode, the preset minimum value is a constant.

3. Device according to claim 1, wherein the control device is arranged such that in the first user mode, the preset minimum value is practically equal to 1° Celsius.

4. Device according to claim 1, wherein the control device is provided with an algorithm using a function of the ambient temperature, and on the basis of which the top value of the lowest air temperature is calculated in the first user mode.

5. Device according to claim 1, wherein the control device is connected to a signaling device which is arranged to indicate when the measured lowest air temperature drops under a certain signal value.

6. Device according to claim 5, wherein the signaling device is selected from the group consisting of an LED, an intermittent light, and a loudspeaker and any combination thereof.

7. A device for cool drying a gas comprising:
    a cooling circuit including a heat exchanger having a vaporizer, a compressor for compressing a cooling fluid, wherein said compressor is driven by a motor, a condenser arranged to condense said cooling fluid, an expansion device between an outlet of the condenser and an inlet of the vaporizer, a control device arranged to control the motor of the compressor, and a measuring device coupled thereto;
    said heat exchanger having an inlet and outlet pipe arranged to receive the gas to be dried;
    a liquid separator connected to the outlet pipe of the heat exchanger,
    wherein the measuring device includes a first temperature measuring device arranged to measure the lowest air temperature of the gas to be dried, a second temperature measuring device arranged to measure the ambient temperature and a flow meter in the pipe for the gas to be dried,
    wherein said control device is connected to a signaling device arranged to indicate when the measured lowest air temperature drops under a certain signal value, said control device being configured so that the control device is switchable in at least two user modes for controlling the lowest air temperature of the gas to be dried, said at least two user modes including;
    a first user mode in which the cooling circuit is only activated when the measured flow of the gas to be dried through the pipe exceeds a preset value and where the cooling circuit is switched off each time the lowest air temperature drops to a preset minimum value, and remains switched off until the lowest air temperature has reached a certain top value, and a second user mode in which the cooling circuit is controlled by switching the motor on and off, so as to maintain the lowest air temperature of the gas to be dried between a preset minimum and maximum threshold value, and wherein the control device is provided with algorithms using a function of the measured ambient temperature for calculating the threshold values, and wherein said control device is further provided with an algorithm using a function of the measured ambient temperature for calculating the signal value based on a function which is constant up to a certain set value of the ambient temperature and which has an almost linear ascending course at higher ambient temperatures.

8. Device according to claim 7, wherein the linear ascending function course of the signal value is a constant value under the ambient temperature.

9. Device according to claim 1, wherein the control device is arranged such that, in the second user mode, the cooling circuit is only activated when a certain preset minimum flow of gas to be dried flows through the secondary part of the heat exchanger.

10. Device according to claim 1, including a motor rotational speed control arranged to adjust the rotational speed of the motor, said speed control connected to the control device.

11. Device according to claim 10, wherein the motor speed control comprises a frequency transformer.

12. Device according to claim 10, wherein the control device is provided with an algorithm using a function of the ambient temperature for calculating the required lowest air temperature and wherein the control device is arranged such that, in the second user mode, the cooling circuit is controlled by measuring the lowest air temperature and by comparing this measured lowest air temperature value to the required lowest air temperature value and by subsequently adjusting the rotational speed of the motor, so as to adjust the actual lowest air temperature to the calculated lowest air temperature.

13. Device according to claim 1, including a cooling fan arranged to cool the condenser, said fan being connected to the control device.

14. Device according to claim 13, wherein the measuring device includes a condenser temperature measuring arrangement.

15. Device according to claim 13, wherein the control device is arranged so that it controls the fan as a function of either or both the flow of gas to be dried flowing through the secondary part of the heat exchanger and the condenser temperature.

16. Device according to claim 1, wherein the cooling circuit further comprises a bypass line having a bypass valve and an opening/shut-off valve, said bypass line configured to bridge the compressor.

17. Device according to claim 16, wherein the opening/shut-off valve is connected to the control device.

18. Device according to claim 16, wherein the control device is arranged so that the opening/shut-off valve is opened when the vaporizer temperature is considerably lower than a directional value and is closed again when this set point is approached again.

19. Device according to claim 1, wherein the measuring device for the lowest air temperature is provided in the pipe for the gas to be dried, after the secondary part of the heat exchanger.

20. Device according to claim 1, wherein the control device is arranged such that, each time the motor is started, it will stay operational during a certain time interval.

21. Device according to claim 1, wherein the control device is arranged such that the number of times per hour that the motor is started is restricted.

22. Device according to claim 1, wherein the control device is arranged such that, each time the motor is started, the frequency during a certain time interval is kept constant.

* * * * *